(12) United States Patent
Xu et al.

(10) Patent No.: US 11,178,542 B1
(45) Date of Patent: Nov. 16, 2021

(54) METHOD AND SYSTEM FOR SECURE DEVICE-TO-DEVICE DATA COMMUNICATIONS

(71) Applicant: Syniverse Technologies, LLC, Tampa, FL (US)

(72) Inventors: Huiyue Xu, Tampa, FL (US); Deliang Qian, Tampa, FL (US); Zhengcao Zhang, Xi'an (CN); Boyong Chen, Xi'an (CN)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/236,663

(22) Filed: Apr. 21, 2021

Related U.S. Application Data

(60) Provisional application No. 63/013,267, filed on Apr. 21, 2020.

(51) Int. Cl.
| | |
|---|---|
| *H04W 12/033* | (2021.01) |
| *H04L 29/06* | (2006.01) |
| *H04W 12/122* | (2021.01) |
| *H04W 12/06* | (2021.01) |

(52) U.S. Cl.
CPC ....... *H04W 12/033* (2021.01); *H04L 63/0263* (2013.01); *H04L 63/166* (2013.01); *H04W 12/06* (2013.01); *H04W 12/122* (2021.01)

(58) Field of Classification Search
CPC . H04W 12/033; H04W 12/122; H04W 12/06; H04L 63/166; H04L 63/0263
See application file for complete search history.

(56) References Cited

U.S. PATENT DOCUMENTS

| | | | |
|---|---|---|---|
| 2002/0083200 A1* | 6/2002 | Haulund | H04L 67/1036 709/245 |
| 2009/0094680 A1* | 4/2009 | Gupta | H04L 63/104 726/3 |

(Continued)

OTHER PUBLICATIONS

Wu et al., The Double Channel Communication and Key Configuration Techniques of Smart Gasometer Data Transfer Network in a Heterogeneous Environment, Aug. 2016, 7th IEEE International Conference on Software Engineering and Service Science, pp. 85-89 (Year: 2016).*

*Primary Examiner* — Kenneth W Chang
(74) *Attorney, Agent, or Firm* — Andriy Lytvyn; Smith & Hopen, P.A.

(57) ABSTRACT

This invention relates generally to the field of security and remote data communications, specifically to data communications between applications running on different devices residing in different service provider networks. The invention includes methods and systems to resolve the application host based on user defined naming schema, automate the secure tunnel creation among the communication entities via Security Enforcement Servers, start up the applications via secure out of band control channel, perform packet inspection and anomaly detection based on injected user rules and historical traffic pattern, generate alert or notifications via email, text, etc. to specific users. The invention further tears down the secure connection based on application demand or inactivity timeout, generates event and statistic data records for troubleshooting and future auditing.

18 Claims, 8 Drawing Sheets

(56) References Cited

U.S. PATENT DOCUMENTS

| | | | |
|---|---|---|---|
| 2012/0005477 A1* | 1/2012 | Wei | H04L 63/0272 |
| | | | 713/153 |
| 2016/0095153 A1* | 3/2016 | Chechani | H04W 76/12 |
| | | | 370/338 |
| 2016/0165663 A1* | 6/2016 | Shanmugam | H04W 76/10 |
| | | | 370/338 |
| 2017/0164193 A1* | 6/2017 | Bicket | H04W 12/02 |
| 2018/0115554 A1* | 4/2018 | Dyon | H04L 63/164 |
| 2018/0234395 A1* | 8/2018 | Jalkanen | H04W 12/033 |

* cited by examiner

METHOD AND SYSTEM FOR SECURE DEVICE-TO-DEVICE DATA COMMUNICATIONS

PRIORITY CLAIM

This non-provisional application claim priority to a U.S. provisional application No. 63/013,267 filed on Apr. 21, 2020, which is incorporated herein by reference.

BACKGROUND OF THE INVENTION

1. Field of the Invention

This invention relates generally to the field of security and remote data communications.

Specifically, the invention relates to a method and system for secure device-to-device data communications between end-devices residing in different service provider networks, wherein applications hosted thereon are not reachable from the public Internet.

2. Brief Description of the Related Art

Implementation of effective and secure device-to-device communication under the public Internet or a wide area network continues to be a challenge due to various technical restrictions, including network topology, firewall and security, device discovery, etc. Implementation of device-to-device communications over the cellular network also presents challenges, especially in the scenarios involving different generations of mobile technologies (3G, 4G, and 5G) and the mobility nature, in which the device IP and session can be updated when the device is moving.

Device-to-device communication is beneficial for remote access, direct communication, file sharing, and other applications. For example, users of Internet of Things (IoT) devices, such as cameras, smart door locks, motion sensors, smart switches, etc., have a need to check statuses of those IoT devices remotely when the users are away from their homes. In the current state of the art, the IoT devices typically connect over the public Internet to different servers provided by the manufactures of those devices. Users can then check the statuses of those IoT devices by remotely connecting to their respective servers over the public Internet. However, such connection over the public Internet poses a risk due to threats of the IoT devices being hacked remotely due to possible security vulnerabilities associated with the IoT devices or the servers. The severity of this problem is further exacerbated by a concern that the breach of security of one IoT device could impact other IoT devices deployed at the user's home, if these IoT devices are all connected via the same home Wi-Fi network. Furthermore, home Wi-Fi networks are more susceptible to security breaches because they generally have less security measures than corporate Wi-Fi or LAN.

Thus, there is an unresolved need for an effective and secure solution for establishing device-to-device data communications without requiring a connection to the public Internet.

SUMMARY OF THE INVENTION

Embodiments of the invention pertain to methods and systems for a secure device-to-device data communication. The disclosed methods and systems achieve secure remote data access and automate device management and monitoring with real-time data analytics. Embodiments of the invention enable end users to remotely access their devices and the applications running on those devices. Such remote access can be achieved using an intuitive user interface. The methods and system can be configured to generate and transmit alerts when anomalies are detected.

The disclosed methods and systems achieve this functionality in the manner described below. The application host is resolved based on user-defined naming schema. The secure tunnel creation is automated between the communication entities via Security Enforcement Servers. The applications are configured to start up via a secure, out-of-band control channel. Packet inspection and anomaly detection are preformed based on injected user rules and historical traffic patterns. Alerts and notifications can be transmitted via email, text, or other means to the specified users. The invention can be further configured to tear down the secure connection based on application demand or inactivity timeout and to generate event and statistic data records for troubleshooting and future auditing.

In an embodiment, the invention provides a total solution for enabling the device-to-device communications in a secure and simple way, applicable to fixed line, broadband access, and mobile networks. This solution introduces a system including Device Management Server and Security Enforcement Server running on distributed cloud servers to mediate the communication between different end-devices and perform security policy checking and anomaly detection.

In an embodiment, the invention pertains to a method of enabling wireless data communication between a first end-device and a second end-device without requiring the first end-device or the second end-device to be connected to the public Internet. This method includes a step of receiving a request from a first application hosted on the first end-device to connect to a second end-device. The second end-device can be communicatively coupled to an access device (for example, a hotspot device or an Internet of Things (IoT) gateway) via a first wireless network. In this embodiment, the access device is further configured to transmit and receive data via a second wireless network, for example a mobile network. The access device can be configured to communicate with a blockchain digital ledger, and wherein the blockchain digital ledger is configured to store a proof of ownership, connectivity credentials, or security policies associated with the access device or the end-device.

When a request for a device-to-device connection is received from the first application, the first application can be resolved to the first end-device based on an application-to-host-device mapping stored in a name resolution server. The identity of the first end-device is validated for connection to the second end-device and/or connection to the access device. Next, a first secure data communication channel is established between the first end-device and a server, and a second secure data communication channel is established between the server and the access device. A first Internet Protocol (IP) address associated with the access device and/or the second end-device is provided to the access device, and a second IP address associated with the access device is provided to the first end-device. Upon establishment of the first and second secure data communication channels, a data payload is routed between the first end-device and the second end-device via the first and the second secure data communication channels.

In an embodiment, network routing and firewall policies are injected into the first end-device, the access device, the second end-device, and/or the server. Furthermore, the data payload can be inspected at the first server based on a set of predefined rules or a historical traffic pattern to detect an anomaly. If an anomaly is detected, the first and the second secure data channels are torn down, and an alert can be transmitted to a designated recipient, such as a system administrator. The alert can be transmitted using a voice call, an email, a Short Message Service (SMS) message, a Multimedia Messaging Service (MMS) message, a Rich Communication Services (RCS) message, or a push notification.

In an embodiment, the first and/or the second data communication channel can be established based on an Internet Protocol Security (IPSec), a Secure Sockets Layer (SSL), or a Transport Layer Security (TLS) Virtual Private Network (VPN). The first end-device and the access device can function as VPN clients and the server can function as a VPN concentrator. In an embodiment, the first data communication channel and/or the second data communication channel can be established based on a secure Server Density agent (SD-agent) deployed on the first end-device, the second-end device, the access device, or the server.

In an embodiment, setup requests to establish the first and the second data communication channels are initiated via an independent control channel. The independent control channel can be created using a Transmission Control Protocol/Internet Protocol (TCP/IP), including a Hypertext Transfer Protocol Secure (HTTPS), a Representational State Transfer (REST), or a Message Queuing Telemetry Transport (MQTT) protocol. The independent control channel can also be established using a SMS or a RCS protocols. The first end-device, the second end-device, and/or the access device can be configured to process a command conveyed in a SMS or a RCS message.

In an embodiment, in response to detecting that a first secure data communication channel has been disconnected, the second secure data communication channel is also torn down.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
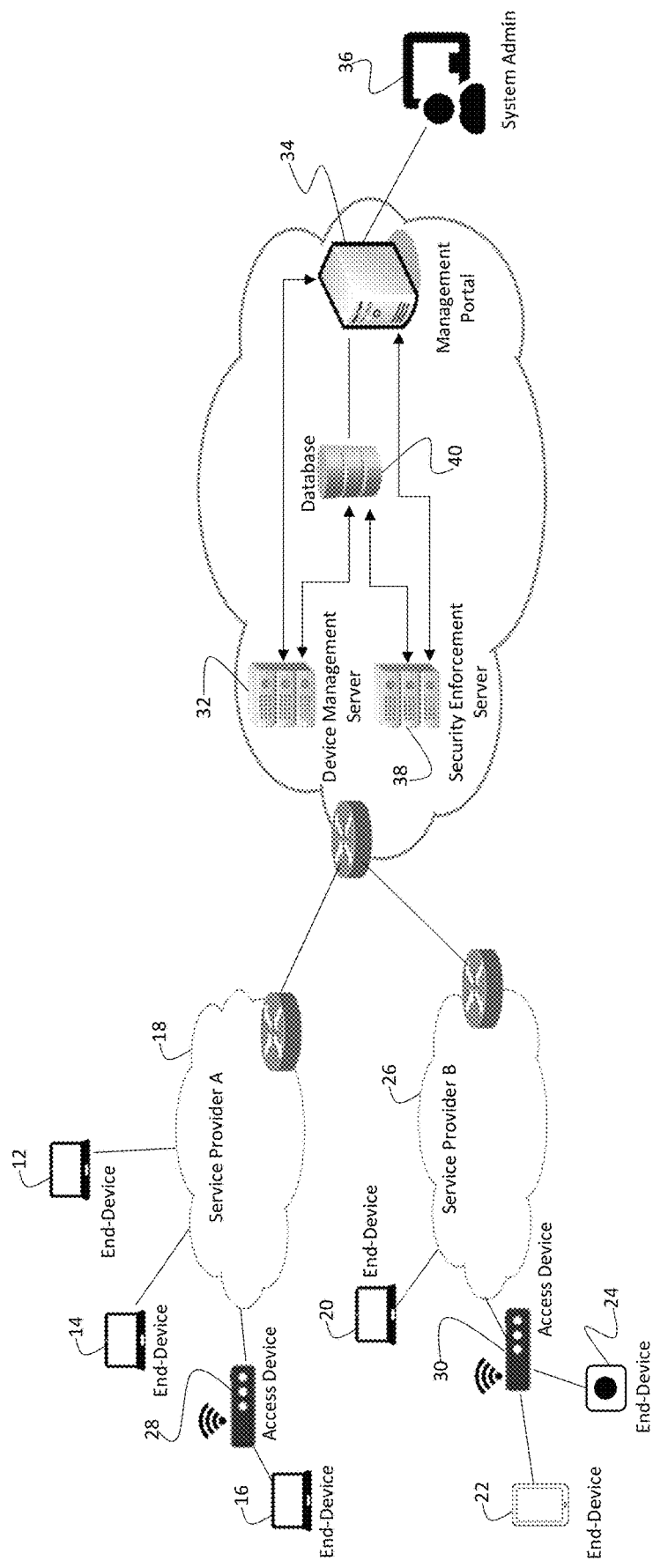
FIG. 1 is a block diagram schematically depicting an exemplary network architecture of an embodiment of the invention.

Embodiments of the present disclosure pertain to apparatuses, methods and systems for enhancing the network connectivity management to achieve secure data access and to automate the device management and monitoring with real-time data analytics. FIG. 1 depicts an exemplary architecture of an embodiment of the invention. FIG. 1 depicts a plurality of end-devices, including an end-device 12, an end-device 14, and an end-device 16 connected to a first service provider network 18. FIG. 1 further depicts an end-device 20, an end-device 22, and an end-device 24 connected to a second service provider network 26. In this example, end-devices 12, 14, 16, and 22 are User Equipment (UE) devices, while end-device 24 is an IoT device, for example, a motion sensor.

FIG. 1 further depicts that end-devices 12, 14, and 20 are connected directly to service provider networks 18 and 26, while end-devices 16, 22, and 24 are connected to service provider networks 18 and 26 via a first access device 28 and a second access device 30, respectively. Specifically, in this example, end-device 16 is connected to service provider network 18 via first access device 28, and end-devices 22 and 24 are connected to service provider network 26 via second access device 30. Access devices 28 and 30 can be mobile hotspot devices or IoT gateway devices. According to an embodiment of the invention, access devices 24 and 30 can be equipped with enhanced hardware, firmware, and software components configured to enable secure device-to-device connections, as explained in more detail below.

In an embodiment, access devices 28 and 30 include at least two different wireless transceivers. For example, the first wireless transceiver of access device 30 is used to establish and maintain a first wireless connection between access device 30 and end-devices 22 and 24. The second wireless transceiver of access device 30 is used to establish and maintain a second wireless connection to service provider network 26. To that end, access device 30 is equipped with at least one physical or virtual Subscriber Identification Module (SIM). The SIM is configured to store credentials provided by service provider network 26. These credentials are used to authenticate, validate, and claim ownership of access device 30. In an embodiment, the SIM can be configured to store tamper-proof connectivity certificate that can be retrieved by the firmware and/or software of access device 30. Access device 28 has analogous components to those discussed above with respect to access device 30.

FIG. 1 further depicts a Device Management Server 32. Access devices 28 and 30 can be equipped with software modules configured to enable them to connect to Device Management Server 32, such as blockchain digital ledger or device management application server. Device Management Server 32 can be hosted on the public Internet or deployed on a private network. Device Management Server 32 can be configured to automate management of access devices 28 and 30 and/or end-devices 16, 22, and 24 connected thereto via a management portal 34 accessible to system administrator 36, without the need for administrator to login into access devices 28 and 30 and/or end-devices for configuration and data provision.

The system of the present disclosure can include a management network in the form of a blockchain network. The management network can be configured to record and maintain transactions records into database 40, where they are maintained in a secure and immutable way. In an embodiment, the management network can involve multiple device management application servers hosted by a hosting company to provide secure communications with access devices and/or end-devices. The system can further consist of an Authentication Server or Active Directory server for user and end-device authentication. An Application Programming Interface (API) Server can be used to interface with an application in the management network and also interface with mobile network core elements to execute data plan control, short message notification, device profile update, etc. A dynamic International Mobile Subscriber Identity (IMSI) server can be used to keep track of device profiles and dynamically update them based on predefined policies.

In an embodiment, the connectivity management device data is stored using Device Management Server 32, such as a blockchain digital ledger or device management application server. The method further includes generating and storing the ownership proof, connectivity credentials, and security policies into said management system. Credential data can be retrieved from said Device Management Server 32 and end-devices and/or access devices.

FIG. 1 further depicts a Security Enforcement Server 38. Security Enforcement Server 38 is configured to establish secure data communications channels (tunnels) with end-devices either directly or via access devices 28 and 30. For example, in an embodiment pertaining to remote management of IoT devices, Security Enforcement Server 38 can be configured to establish a first secure data communication channel with end-device 12 (which is a UE device) and a second secure data communication channel with end-device 24 (which is an IoT device) via access device 30, thereby enabling end-device 12 and end-device 24 to wirelessly exchange payload data in a secure manner without requiring end-devices 12 and 24 to have connections to the public Internet. In other embodiments, the secure data communications channels established via Security Enforcement Server 38 can be used to enable wireless device-to-device data communication between any end-devices and/or between applications hosted thereon, including connections between end-devices located in different geographic locations, end-devices connected to different service provider networks, and one-to-many connections.

Figure 2:
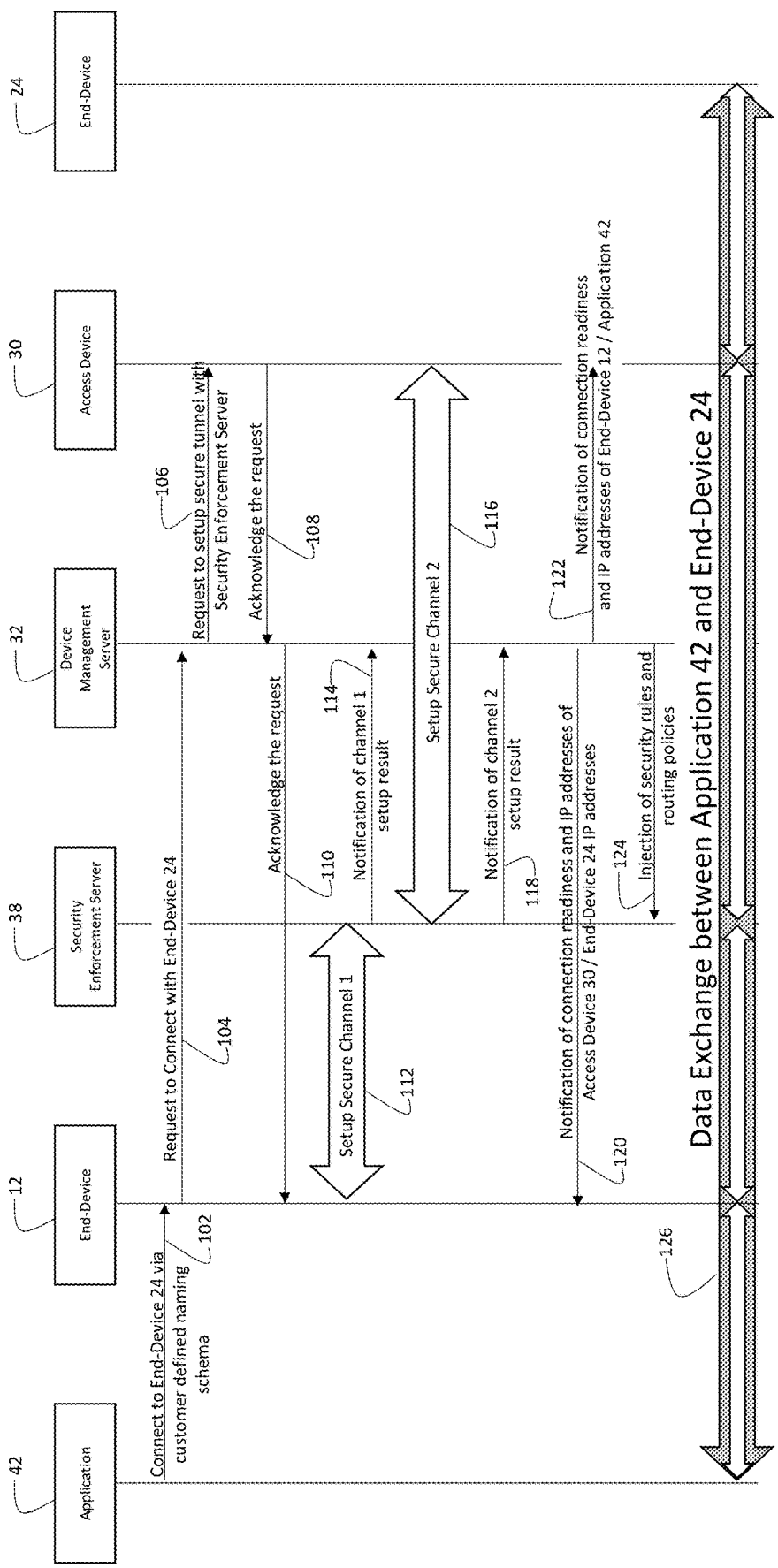
FIG. 2 is a call flow diagram for the secure connection establishment procedure for a connection between a first end-device and the second end-device, wherein the second end-device is communicatively coupled to an access device via a wireless connection.

Continuing with the above example pertaining to device-to-device connection between a UE and an IoT device, FIG. 2 depicts a signaling flow for establishing a wireless connection between an application 42 hosted on end-device 12 (UE device) and end-device 24 (IoT device). The process begins with step 102, in which application 42 issues a request to end-device 12 to connect to end-device 24. In step 104, end-device 12 sends a connect request to Device Management Server 32. In step 106, Device Management Server 32 requests access device 30 to setup a secure tunnel between access device 30 and Security Enforcement Server 38. In step 108, access device 30 responds to Device Management Server 32 with an acknowledgement message. In step 110, Device Management Server 32 sends the acknowledgement message to end-device 12.

Next, in step 112, a first secure wireless communication channel is established between end-device 12 and Security Enforcement Server 38. In step 114, Security Enforcement Server 38 notifies Device Management Server 32 that the first secure channel has been established. In step 116, Security Enforcement Server 38 establishes a second secure wireless communication channel with access device 30. In step 118, Security Enforcement Server 38 notifies Device Management Server 32 that the second secure channel has been successfully established.

In step 120, Device Management Server 32 provides IP addresses of access device 30 and/or end-device 24 to end-device 12, and, in step 122, Device Management Server 32 provides IP addresses of end-device 12 and/or application 42 to access device 30. Then, in step 124, Device Management Server 32 injects security rules and routing policies into Security Enforcement Server 38. At this point, a device-to-device connection between end-device 12 and end-device 24 is established. In step 126, application 42 hosted on end-device 12 (UE) and end-device 24 (IoT device) exchange payload data using the first and the second secure wireless communication channels established via Security Enforcement Server 38.

Figure 3:
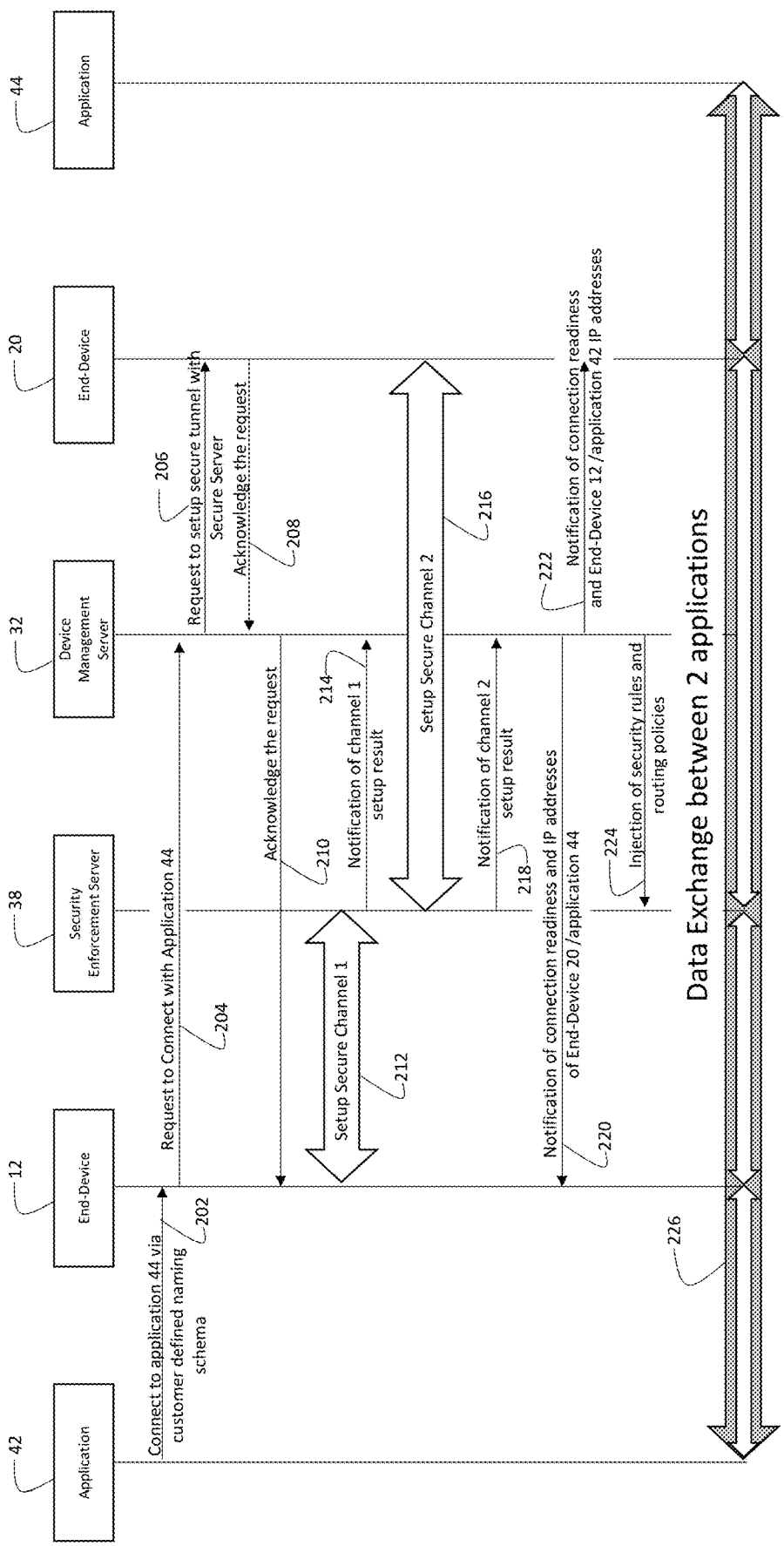
FIG. 3 is a call flow diagram for the secure connection establishment procedure for a connection between an application hosted on a first end-device and an application hosted on the second end-device.

FIG. 3 depicts another exemplary scenario in which application 42 hosted on end-device 12 requests to wirelessly exchange payload data with application 44 hosted on end-device 20. The method begins at step 202, in which application 42 issues a request to end-device 12, requesting end-device 12 to connect to application 44 hosted on end-device 20. In step 204, end-device 12 sends a corresponding connect request to Device Management Server 32. In step 206, Device Management Server 32 sends a request to end-device 20 to setup a secure tunnel between end-device 20 and Security Enforcement Server 38. In step 208, end-device 20 responds to Device Management Server 32 with an acknowledgement message. In step 210, Device Management Server 32 sends the acknowledgement message to end-device 12.

Next, in step 212, a first secure wireless data communication channel is established between end-device 12 and Security Enforcement Server 38. In step 214, Security Enforcement Server 38 notifies Device Management Server 32 that the first secure channel has been established. In step 216, Security Enforcement Server 38 establishes a second secure wireless data communication channel with end-device 20. In step 218, Security Enforcement Server 38 notifies Device Management Server 32 that the second secure channel has been successfully set up.

In step 220, Device Management Server 32 provides IP addresses of end-device 20 and/or application 44 to end-device 12, and, in step 222, Device Management Server 32 provides IP addresses of end-device 12 and/or application 42 to end-device 20. Then, in step 224, Device Management Server 32 injects security rules and routing policies into Security Enforcement Server 38. At this point, a device-to-device connection between end-device 12 and end-device 20 can be established. In step 226, application 42 hosted on end-device 12 and application 44 hosted on end-device 20 exchange payload data using the first and the second secure wireless communication channels established via Security Enforcement Server 38.

Figure 4:
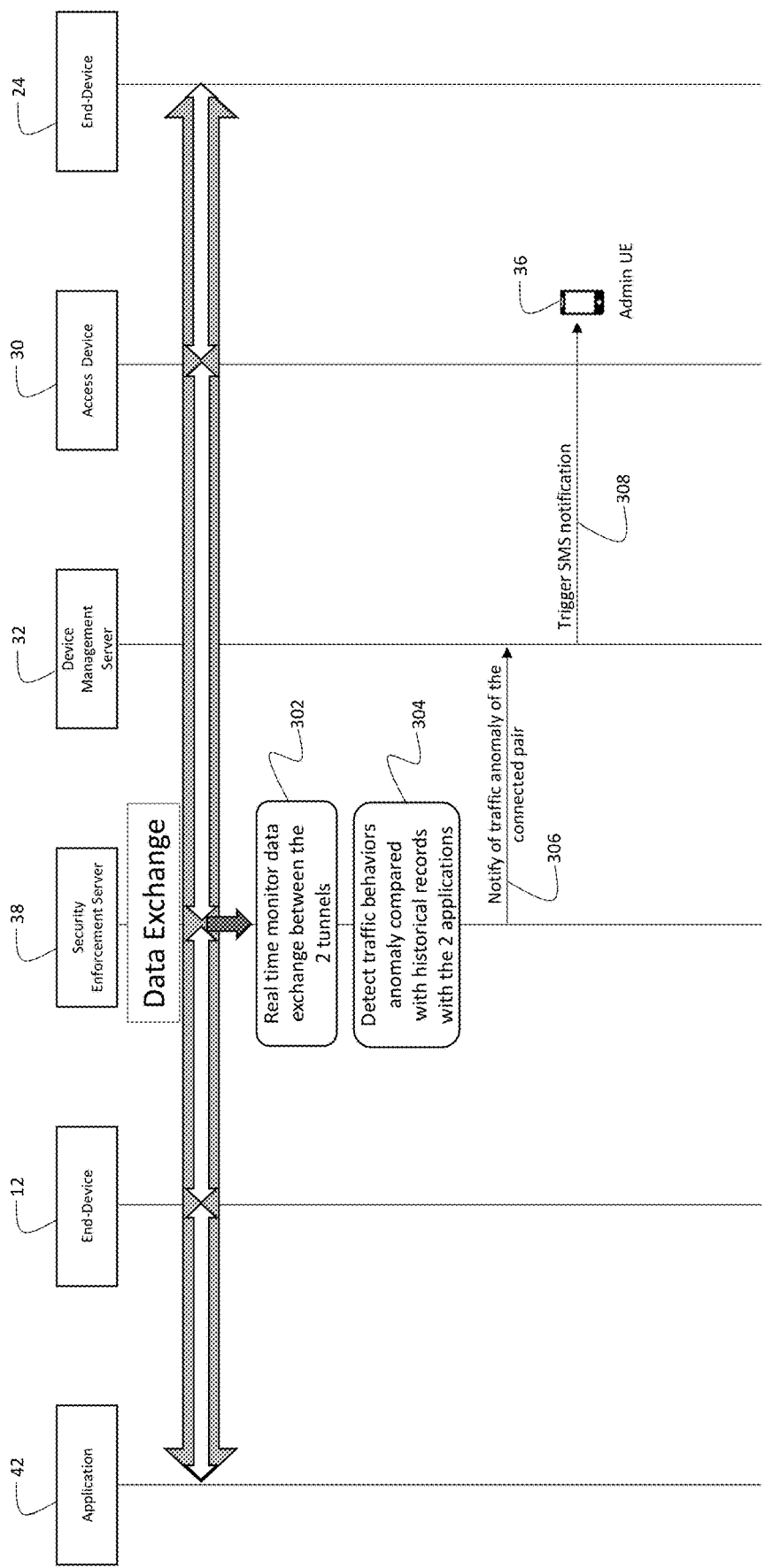
FIG. 4 is a call flow diagram for anomaly detection based on the examined data payload between the first end-device and the second end-device.

FIG. 4 depicts that, in step 302, after the wireless data communication channels are established, Security Enforcement Server 38 continues to monitor data exchanged between the first secure communication channel and the second secure communication channel. In step 304, Security Enforcement Server 38 is configured to detect traffic behavior anomalies relative to historical record of data exchange between application 42 and end-device 24. If Security Enforcement Server 38 detects an anomaly, Security Enforcement Server 38 notifies Device Management Server 32 in step 306. Then, in step 308, Device Management Server 32 triggers an alert transmitted to an administrator UE 36. The alert can be transmitted as a voice call, an email, a Short Message Service (SMS) message, a Rich Communication Service (RCS) message, a Multimedia Messaging Service (MMS) message, or a push notification.

Figure 5:
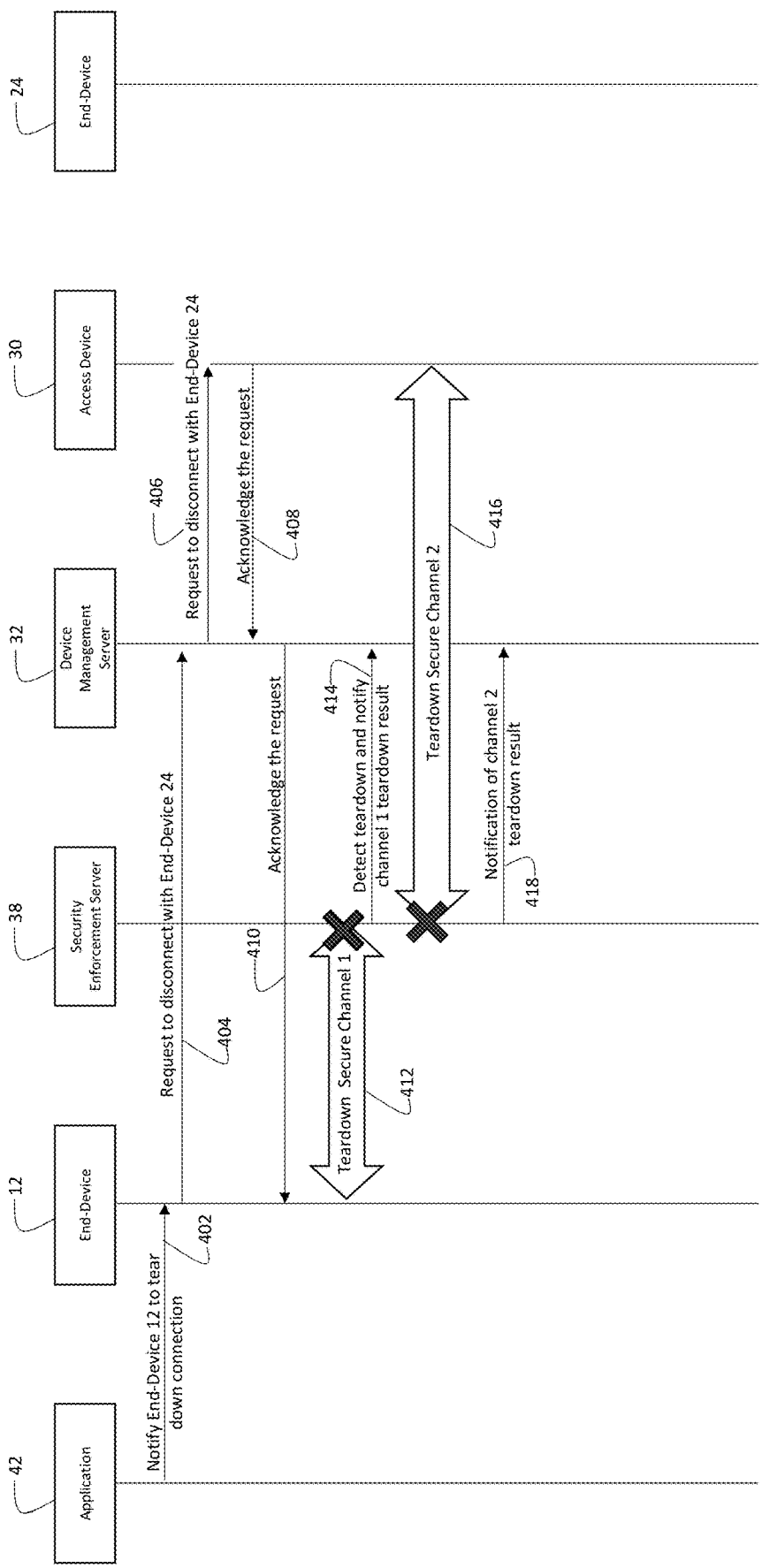
FIG. 5 is a call flow diagram for secure connection teardown procedure in response to a request from the first end-device.

FIG. 5 depicts a signaling flow diagram for teardown of data connection between end-device 12 and end-device 24. In step 402, application 42 requests end-device 12 to tear down the data connection with end-device 24/access device 30. In step 404, end-device 12 sends a request to Device Management Server 32 to disconnect the data connection between end-device 12 and end-device 24. In step 406, Device Management Server 32 sends the request to disconnect to access device 30. In step 408, access device 30 acknowledges the request to disconnect. In step 410, Device Management Server 32 sends an acknowledgement to end-device 12.

In step 412, Security Enforcement Server 38 tears down the first secure wireless data communication channel between Security Enforcement Server 38 and end-device 12. In step 414, Security Enforcement Server 38 notifies Device Management Server 32 that the first secured channel has been torn down. Next, in step 416, Security Enforcement Server 38 tears down the second secure communication cannel between Security Enforcement Server 38 and access device 30. Then, in 418, Security Enforcement Server 38 notifies Device Management Server 32 that the second communication channel has also been torn down.

Figure 6:
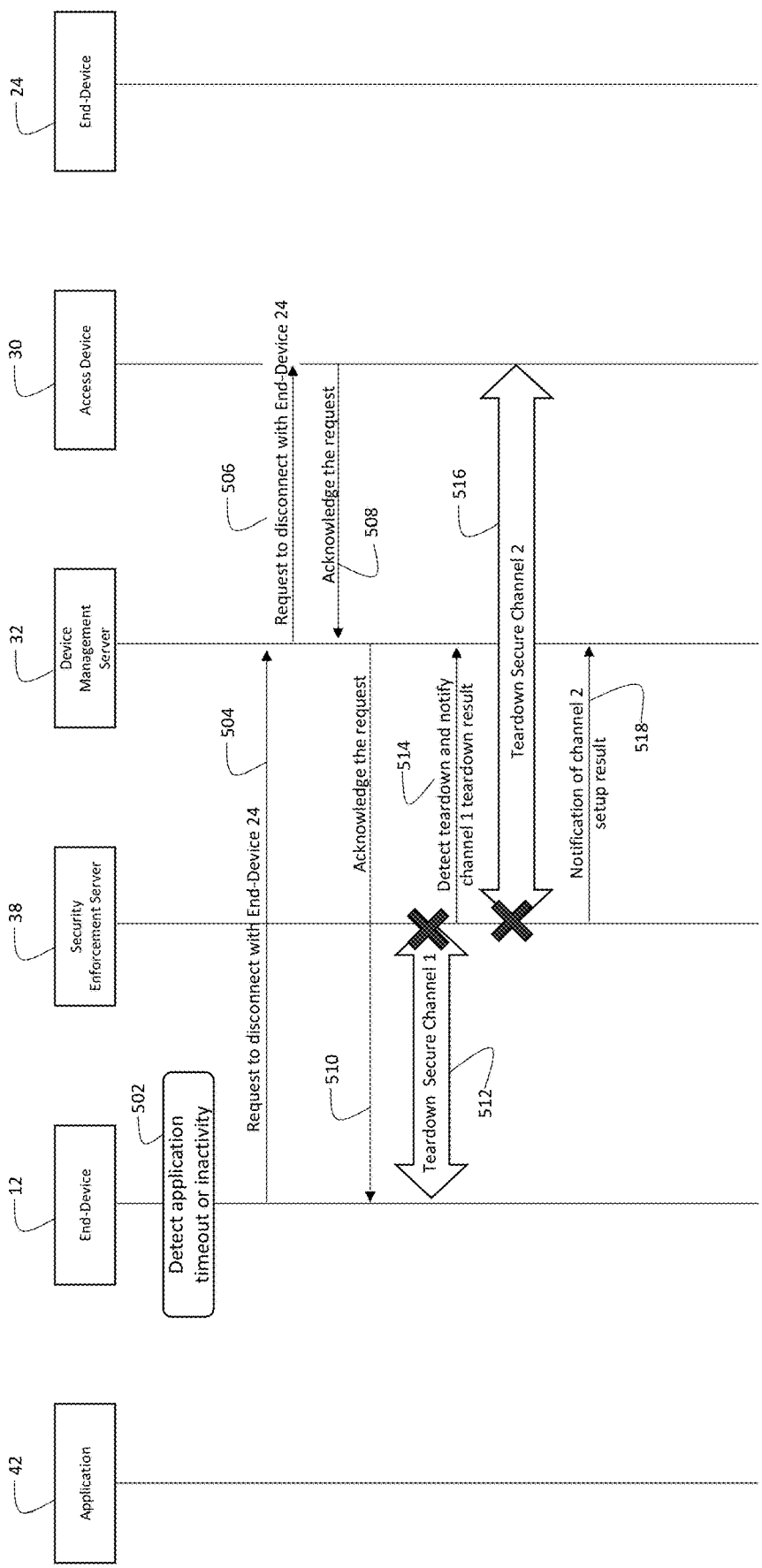
FIG. 6 is a call flow diagram for secure connection teardown procedure based on a connection timeout.

FIG. 6 depicts a method of tearing down the communication channels due to a timeout or a period of inactivity. The method begins in step 502, in which end-device 12 determines that application 42 has ben inactive for a period of time exceeding a predefined threshold duration. In response to this determination, end-device 12 triggers a request to disconnect the data connection with end-device 24 to Device Management Server 32. After that, the remaining steps 508-518 are substantially similar to the steps 408-418 described above with respect to FIG. 5.

Figure 7:
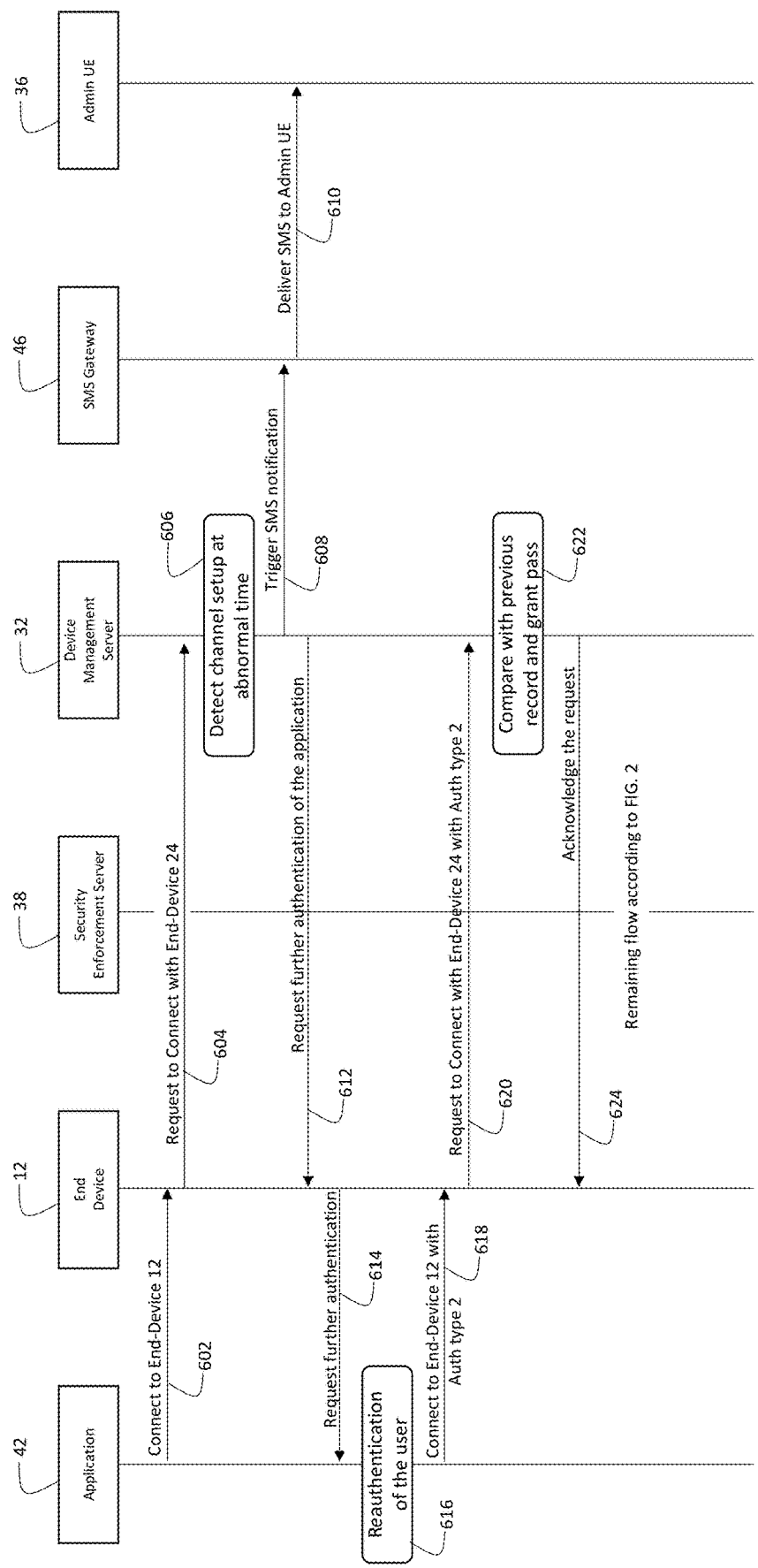
FIG. 7 is a call flow diagram for anomaly detection during a request for establishing a device-to-device connection.

FIG. 7 depicts a signaling flow diagram for the scenario in which an anomaly is detected during the process of establishing a device-to-device connection. The process begins with step 602, in which application 42 hosted on end-device 12 sends a connect request. In step 604, end-device 12 sends a request to Device Management Server 32 requesting to connect to end-device 24. In step 606, Device Management Server 32 analyzes the request and identifies an anomaly—for example, connection is being requested at a time that falls outside of historical connection pattern between end-devices 12 and 24. In step 608, Device Management Server 32 triggers a notification—for example, via a SMS message—to SMS Gateway 46, which then delivers the notification to the administrator's UE 36 in step 610.

When Device Management Server 32 detects an anomaly pertaining to the connection request, Device Management Server 32 requests further authentication of application 42 by sending a message to end-device 12 in step 612. In step 614, end-device 12 requires application 42 to provide further authentication. In step 616, application 42 requires the user to reauthenticate herself. If the reauthentication is successful, in step 618, application 42 issues another connect request to end-device 12. In step 620, end-device 12 sends a request to connect to end-device 24 to Device Management Server 32. In step 622, Device Management Server 32 compares the newly received connection request with the previous connection record and grants permission for end-device 12 to connect to end-device 24. In step 624, Device Management Server 32 sends the acknowledgement of the connect request to end-device 12. After that, a device-to-device connection between end-devices 12 and 24 is established according to the method depicted in FIG. 2.

Figure 8:
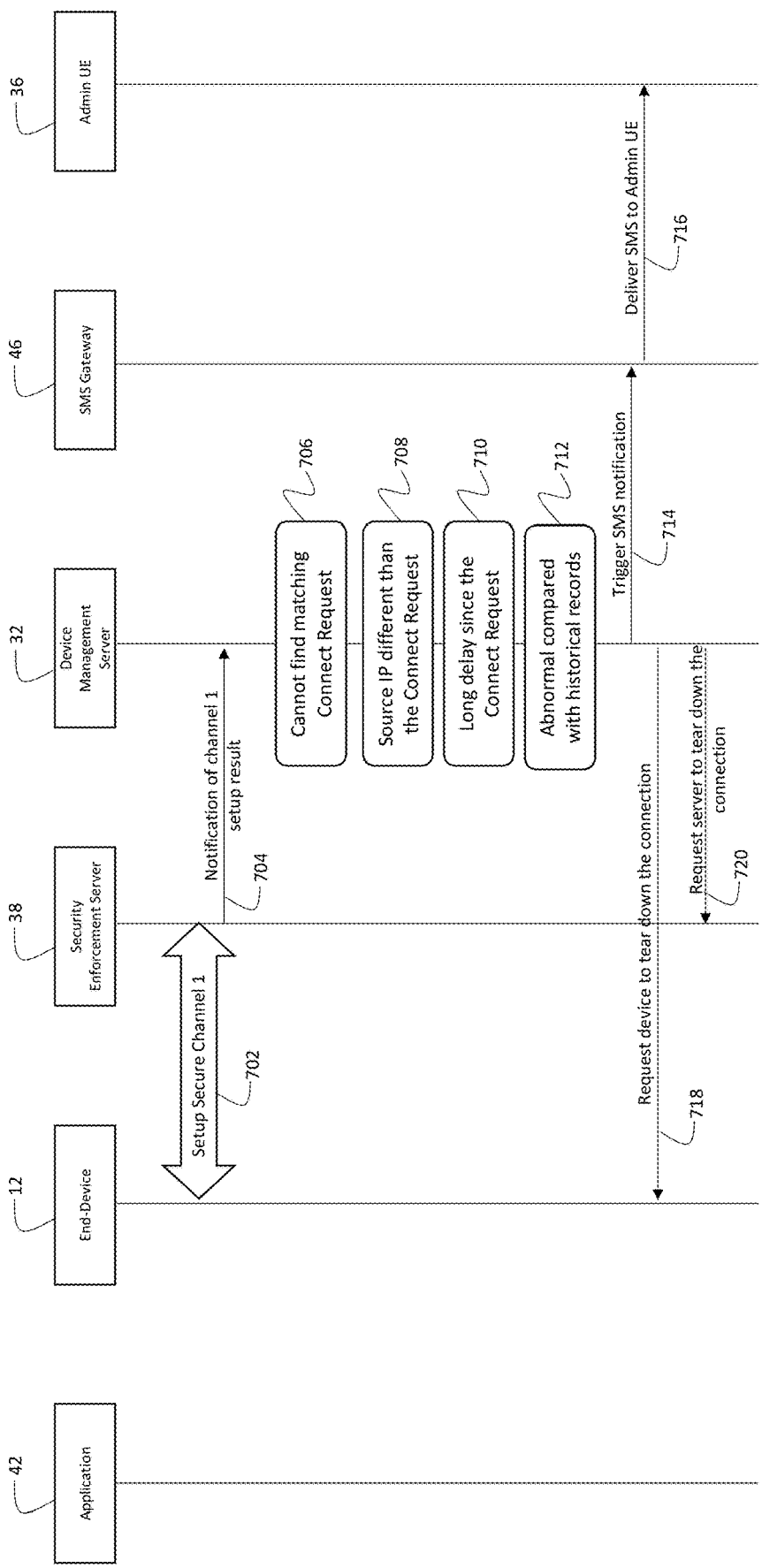
FIG. 8 is a call flow diagram for anomaly detection after the first secure wireless data channel has been established.

FIG. 8 depicts a method of detecting several types of exemplary anomalies. After the secure wireless communication channel is setup between end-device 12 and Security Enforcement Server 38 in step 702, Security Enforcement Server 38 sends a notification of successful communication channel setup to Device Management Server 32 in step 704. In step 706, Device Management Server 32 verifies that it previously received the matching connect request. In step 708, Device Management Server 32 checks to determine whether the source IP address of end-device 12 with which the communication channel was established is the same as the IP address from which the connect request was initially received. In step 710, Device Management Server 32 determines whether the time elapsed between establishment of the secure communication channel and the connect request exceeds a predefined threshold duration. Finally, in step 712, Device Management Server 32 determines whether creation of the secure communication channel deviates from historical connection records. If any of these anomalies are detected, the method proceeds to step 714, in which Device Management Server 32 triggers an SMS alert message to SMS Gateway 46. In step 716, SMS Gateway 46 delivers the alert to administrator's UE 36.

Next, in step 718, Device Management Server 32 sends a request to end-device 12 to tear down the established communication channel. Alternatively, or in addition, Device Management Server 32 can also send a teardown request to Security Enforcement Server 38 in step 720. In this manner, when Device Management Server 32 detects an anomaly associated with the establishment of the first communication channel, Device Management Server 32 aborts the device-to-device connection and triggers the teardown of the first communication channel.

Some aspects of the disclosed methods and system include the following:
1. Automatic trigger for the tunnel creation and pairing based on application traffic:
   a. No manual interaction, no username/password required;
   b. Simplified application/host resolution, users can create their own naming schema to identify different applications at different devices/locations.
2. Auto generation of network routing and firewall policies to block any port/local area network (LAN) scanning:
   a. Only allow communications between the two applications running on different devices;
   b. Dynamic network segregation and route injection to avoid reaching to other devices.
3. No exposure of the listening ports:
   a. No listening agent running on the device side for the secure tunnel setup;
   b. Secure "out of band" communication channel is setup between the device and remote Device Management Server, and bridge the device communications;
   c. Remote application ports are brought up only when the local application needs to communicate, and auto shutdown when the local application communication has been finished.
4. Anomaly detection:
   a. Detect anomalies based on user defined rules and generate SMS/email notification to specified device owner;
   b. Artificial Intelligence (AI)/Machine Learning (ML) based anomaly detection to inspect the encrypted application traffic pattern and to generate SMS/email notification to the administrator.

5. Support multiple communication scenarios:
   a. One device at one location to one device at another location;
   b. One device at one location to multiple devices at another location;
   c. One device at one location to multiple devices at different locations.

HARDWARE AND SOFTWARE INFRASTRUCTURE EXAMPLES

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of enabling wireless data communication between a first end-device and a second end-device without requiring the first end-device or the second end-device to be connected to a public Internet, the method comprising:
   receiving a request from a first application hosted on the first end-device to connect to a second end-device, wherein the second end-device is communicatively coupled to an access device via a first wireless network and wherein the access device is configured to transmit and receive data via a second wireless network;
   resolving the first application to the first end-device based on an application-to-host-device mapping;
   validating identity of the first end-device for connection to the second end-device or the access device;
   establishing a first secure wireless data communication channel between the first end-device and a first server;
   establishing a second secure wireless data communication channel between the first server and the access device;
   providing a first Internet Protocol (IP) address associated with the first end-device to the access device or the second end-device;
   providing a second IP address associated with the access device or the second-end device to the first end-device; and
   routing a data payload between the first end-device and the second end-device via the first and the second secure wireless data communication channels.

2. The method of claim 1, further comprising the step of injecting network routing and firewall policies into the first server, the first end-device, the second end-device, or the access device.

3. The method of claim 1, further comprising the step of inspecting the data payload at the first server.

4. The method of claim 3, wherein the data payload is inspected based on a set of predefined rules or a historical traffic pattern to detect an anomaly.

5. The method of claim 4, wherein the first or the second secure wireless data channel is torn down responsive to detecting the anomaly.

6. The method of claim 4, wherein responsive to detecting the anomaly, an alert is transmitted to a designated recipient.

7. The method of claim 6, wherein the alert is transmitted using a voice call, an email, a Short Message Service (SMS) message, a Multimedia Messaging Service (MMS) message, a Rich Communication Services (RCS) message, or a push notification.

8. The method of claim 1, wherein the first or the second wireless data communication channel is established based on an Internet Protocol Security (IPSec), a Secure Sockets Layer (SSL), or a Transport Layer Security (TLS) Virtual Private Network (VPN).

9. The method of claim 1, wherein the first end-device, the second end-device, or the access device functions as a Virtual Private Network (VPN) client and the first server functions as a VPN concentrator.

10. The method of claim 1, wherein the first data communication channel or the second data communication channel is established based on a secure Server Density agent (SD-agent) deployed on the first end-device, the access device, or the first server.

11. The method of claim 1, wherein setup requests to establish the first and the second secure wireless data communication channels are initiated via an independent control channel.

12. The method of claim 11, wherein the independent control channel is created using a Transmission Control Protocol/Internet Protocol (TCP/IP).

13. The method of claim 12, wherein the TCP/IP protocol is selected from the group consisting of a Hypertext Transfer Protocol Secure (HTTPS), a Representational State Transfer (REST), or a Message Queuing Telemetry Transport (MQTT) protocol.

14. The method of claim 11, wherein the independent control channel is established using a Short Message Service (SMS) or a Rich Communications Service (RCS) protocol.

15. The method of claim 14, wherein the first end-device, the second end-device, or the access device is configured to process a command conveyed in a SMS or a RCS message.

16. The method of claim 1, wherein responsive to detecting that a first secure wireless data communication channel has been disconnected, tearing down the second secure wireless data communication channel.

17. The method of claim 1, wherein the second wireless data connection is established via a mobile network.

18. The method of claim 1, wherein the access device is configured to communicate with a blockchain digital ledger, and wherein the blockchain digital ledger is configured to store a proof of ownership, connectivity credentials, or security policies associated with the access device.

* * * * *